United States Patent
Guo et al.

(10) Patent No.: US 12,146,676 B2
(45) Date of Patent: Nov. 19, 2024

(54) CONTROL METHOD AND DEVICE FOR INCREASING AMOUNT OF CIRCULATING REFRIGERANT AND AIR CONDITIONER

(71) Applicant: Gree Electric Appliances, Inc. of Zhuhai, Guangdong (CN)

(72) Inventors: Jianmin Guo, Guangdong (CN); Shiqiang Zhang, Guangdong (CN); Huachao Jiao, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 349 days.

(21) Appl. No.: 17/786,068

(22) PCT Filed: Nov. 25, 2020

(86) PCT No.: PCT/CN2020/131361
§ 371 (c)(1),
(2) Date: Jun. 16, 2022

(87) PCT Pub. No.: WO2021/174915
PCT Pub. Date: Sep. 10, 2021

(65) Prior Publication Data
US 2023/0023942 A1    Jan. 26, 2023

(30) Foreign Application Priority Data
Mar. 4, 2020   (CN) .................. 202010144518.8

(51) Int. Cl.
*F24F 11/871*   (2018.01)
*F24F 11/38*    (2018.01)
(Continued)

(52) U.S. Cl.
CPC ............ *F24F 11/871* (2018.01); *F24F 11/38* (2018.01); *F24F 11/64* (2018.01); *F24F 11/77* (2018.01);
(Continued)

(58) Field of Classification Search
CPC .................................................. F24F 11/871
See application file for complete search history.

(56) References Cited

U.S. PATENT DOCUMENTS

| | | | |
|---|---|---|---|
| 2020/0041152 A1* | 2/2020 | Xu ........................ | G05B 19/042 |
| 2021/0041129 A1* | 2/2021 | Tan ........................ | F24F 11/64 |
| 2022/0228767 A1* | 7/2022 | Wei ........................ | F25B 49/02 |

FOREIGN PATENT DOCUMENTS

| | | | |
|---|---|---|---|
| CN | 102147144 A | * | 8/2011 |
| CN | 104729021 A |   | 6/2015 |

(Continued)

*Primary Examiner* — Suresh Suryawanshi
(74) *Attorney, Agent, or Firm* — The Webb Law Firm

(57) ABSTRACT

Provided are a control method and apparatus for increasing the amount of a circulating refrigerant, and an air conditioner. The control method includes: when a refrigerating capacity need is equivalent to a heating capacity need in the operation of an air-conditioning system, determining whether the discharge temperature of a compressor is greater than a preset safety alert value; if the discharge temperature of the compressor is greater than the safety alert value, adjusting the frequency of a fan of an outdoor heat exchanger; and when the discharge temperature of the compressor is not greater than the safety alert value, controlling to stop the adjustment of the frequency of the fan, and maintaining the air-conditioning system to operate at the adjusted current frequency of the fan.

19 Claims, 2 Drawing Sheets

(51) Int. Cl.
*F24F 11/64* (2018.01)
*F24F 11/77* (2018.01)
*F24F 11/84* (2018.01)
*F24F 11/88* (2018.01)
*F25B 49/02* (2006.01)

(52) U.S. Cl.
CPC .............. *F24F 11/84* (2018.01); *F24F 11/88* (2018.01); *F25B 49/02* (2013.01); *F25B 2500/08* (2013.01); *F25B 2600/11* (2013.01); *F25B 2700/21152* (2013.01)

(56) References Cited

FOREIGN PATENT DOCUMENTS

| | | | | |
|---|---|---|---|---|
| CN | 206207630 U | | 5/2017 | |
| CN | 107062542 A | * | 8/2017 | ................ F24F 1/38 |
| CN | 107120784 A | | 9/2017 | |
| CN | 107763776 A | | 3/2018 | |
| CN | 109945435 A | | 6/2019 | |
| CN | 110454950 A | | 11/2019 | |
| CN | 110454951 A | | 11/2019 | |
| CN | 110454953 A | | 11/2019 | |
| CN | 110836553 A | | 2/2020 | |
| CN | 111237979 A | | 6/2020 | |
| CN | 113310168 A | * | 8/2021 | .............. F24F 11/30 |
| EP | 4047280 A1 | | 8/2022 | |
| JP | 2002089976 A | | 3/2002 | |
| JP | 2003028519 A | | 1/2003 | |
| WO | WO-2018207275 A1 | * | 11/2018 | .............. F25B 13/00 |

\* cited by examiner

CONTROL METHOD AND DEVICE FOR INCREASING AMOUNT OF CIRCULATING REFRIGERANT AND AIR CONDITIONER

CROSS-REFERENCE TO RELATED APPLICATIONS

This application is the United States national phase of International Patent Application No. PCT/CN2020/131361, filed on Nov. 25, 2020, and claims priority to Chinese Patent Application No. 202010144518.8 filed on Mar. 4, 2020, the disclosures of which are hereby incorporated by reference herein in their entirety.

BACKGROUND OF THE DISCLOSURE

The present disclosure relates to a control method and device for increasing amount of circulating refrigerant and an air conditioner.

DESCRIPTION OF RELATED ART

Under ultra-low temperature conditions, due to the migration properties of the refrigerant, excessive refrigerant is stored in a low-temperature position of a system.

SUMMARY OF THE DISCLOSURE

In the embodiments of the present disclosure, a control method for increasing amount of circulating refrigerant is provided. The method comprises: determining whether an exhaust temperature of a compressor is greater than a preset safety alert value, in a case where a demand for a cooling capacity is equivalent to a demand for a heating capacity during operation of an air-conditioning system; adjusting a frequency of a fan of an outdoor heat exchanger, in a case where the exhaust temperature of the compressor is greater than the preset safety alert value; and controlling to stop adjusting the frequency of the fan and maintaining the air-conditioning system in operation at an adjusted current frequency of the fan, in a case where the exhaust temperature of the compressor is not greater than the preset safety alert value.

In the embodiments of the present disclosure, a control device for increasing amount of circulating refrigerant is also provided. The control device comprises: a determining module configured to determine whether an exhaust temperature of a compressor is greater than a preset safety alert value, in a case where a demand for a cooling capacity is equivalent to a demand for a heating capacity during operation of an air-conditioning system; an adjusting module configured to adjust a frequency of a fan of an outdoor heat exchanger, in a case where the exhaust temperature of the compressor is greater than the preset safety alert value; and a controlling module configured to control to stop adjusting the frequency of the fan and maintaining the air-conditioning system in operation at a current frequency of the fan after adjusting, in a case where the exhaust temperature of the compressor is not greater than the preset safety alert value.

In the embodiments of the present disclosure, a control device for increasing amount of circulating refrigerant is also provided. The control device comprises: a memory; and a processor coupled to the memory and, based on instructions stored in the memory, configured to implement the control method for increasing amount of circulating refrigerant according to any one of the above embodiments.

In the embodiments of the present disclosure, provided is an air conditioner comprising the control device for increasing amount of circulating refrigerant according to one of the above embodiments.

In the embodiments of the present disclosure, provided is a computer-readable storage medium storing computer program instructions thereon, wherein the control method for increasing amount of circulating refrigerant according to any one of the above embodiments is implemented when the instructions are executed by a processor.

BRIEF DESCRIPTION OF THE DRAWINGS

In order to explain the embodiments of the present disclosure more explicitly, a brief introduction will be given below for the accompanying drawings required to be used in the description of the embodiments. It is obvious that, the accompanying drawings illustrated below are merely some of the embodiments of the present disclosure. For those of ordinary skill in the art, other accompanying drawings may also be obtained according to such accompanying drawings on the premise that no inventive effort is involved.

DETAILED DESCRIPTION

In order to make the technical problem(s) to be solved by the present disclosure as well as the technical solution(s) and advantageous effect(s) more explicit, the present disclosure will be further described in detail below in conjunction with the accompanying drawings and embodiments. It should be understood that, the specific embodiments described herein are only intended to explain the present disclosure, but not to limit the present disclosure.

The principles and structures of the present disclosure will be described in detail below in conjunction with the accompanying drawings and embodiments.

In a multi-split heat recovery system, when the demand for the cooling capacity of the heat recovery system is equivalent to the demand for the heating capacity of the heat recovery system (for example, the number of the indoor units required for cooling is the same as the number of the indoor units required for heating), the heat exchanger of the outdoor unit is in non-working state. Under ultra-low temperature conditions, the outdoor heat exchanger is often at an ambient temperature of below −15° C., and most of the refrigerant in the heat recovery system will be gradually stored in the heat exchanger of the outdoor unit in the air-conditioning unit during the operation of the heat recovery system. In this case, high amount of refrigerant will be accumulated in the heat exchanger and circulating refrigerant in the air-conditioning unit is insufficient. During a long period of operation, this will result in a poor cooling or heating effect of the indoor unit in the air-conditioning unit, and even abnormal operation of the air-conditioning unit or damage to the elements of the air-conditioning unit.

Figure 1:
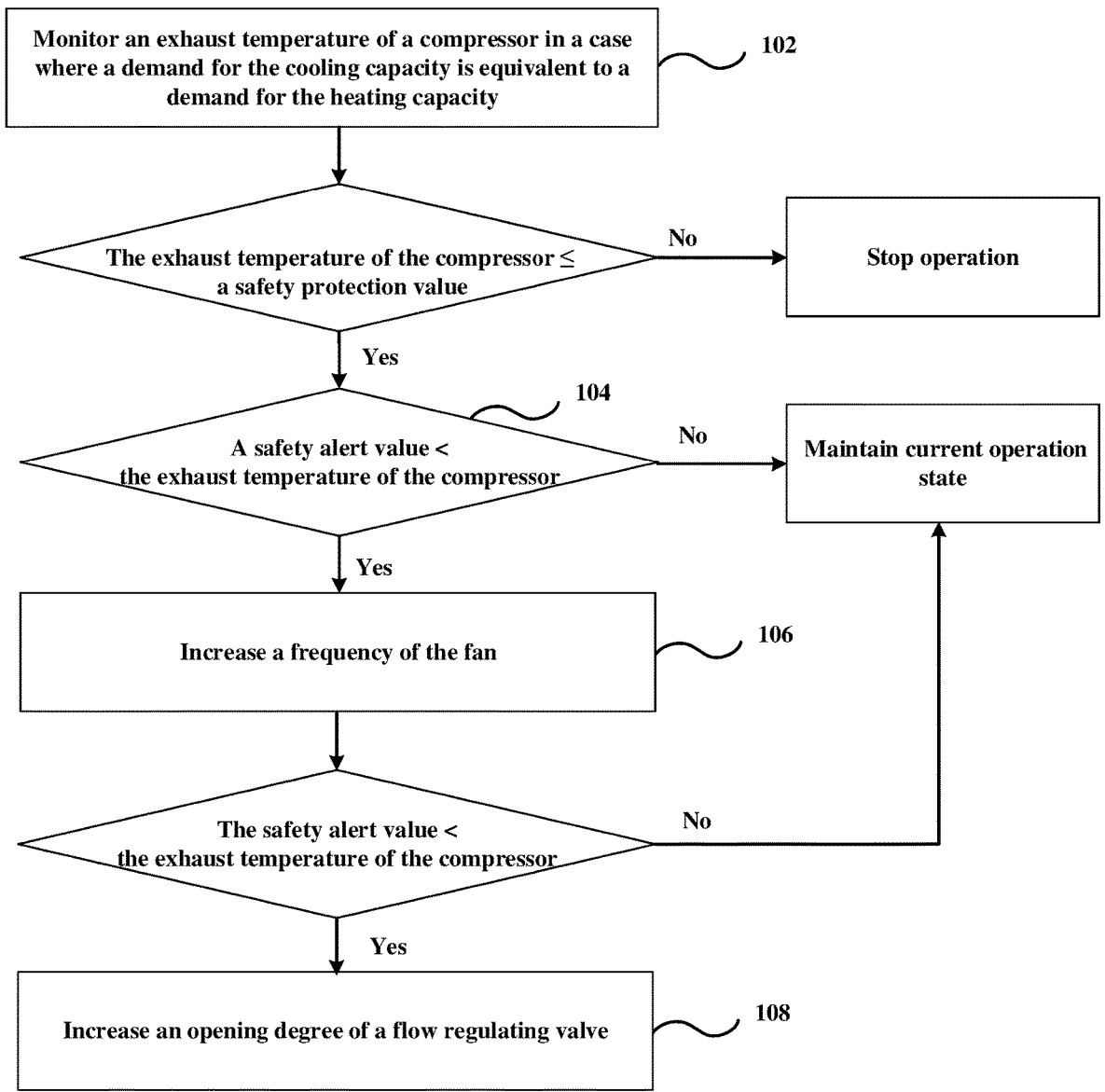
FIG. 1 is a flowchart of a control method for increasing amount of circulating refrigerant according to some embodiments of the present disclosure.

Referring to FIG. 1, the present disclosure proposes a control method for increasing amount of circulating refrigerant.

At step 102, an exhaust temperature of a compressor is continuously monitored, in a case where a cooling capacity is equivalent to a heating capacity during operation of an air-conditioning system (for example, a multi-split heat recovery system).

At step 104, whether the exhaust temperature of the compressor is greater than a preset safety alert value is determined. If yes, step 106 is performed. In some embodiments, if no, current operation is maintained.

At step 106, a frequency of a fan of an outdoor heat exchanger is adjusted. In some embodiments, the frequency of the fan is adjusted to increase. In a case where the exhaust temperature of the compressor is not greater than the preset safety alert value, the frequency of the fan is stopped to be adjusted, and the air-conditioning system is maintained in operation at an adjusted current frequency of the fan. In some embodiments, after operation for a first preset time, in a case where the exhaust temperature of the compressor is continuously not greater than the preset safety alert value within a second preset time, the frequency of the fan is stopped to be adjusted, and the air-conditioning system is maintained in operation at an adjusted current frequency of the fan. That is, current operation state is maintained.

In the above embodiments, the frequency of the fan of the outdoor heat exchanger is controlled in a case where the demand for the cooling capacity is equivalent to the demand for the heating capacity in the air-conditioning system, so that the refrigerant stored in the outdoor heat exchanger is discharged into the refrigerant circulation system to ensure enough circulating refrigerant in the air-conditioning system. Therefore, the operation effects of the cooling indoor unit and the heating indoor unit are improved, the comfort of the air-conditioning unit is improved, the possibility of a damage problem of the elements in the air-conditioning system is reduced, and a failure rate of the elements is reduced.

In some embodiments, the fan is preset with a plurality of first gears corresponding to different frequencies of the fan, and the frequency of the fan can increase as the first gear is adjusted. For example, the frequency of the fan of the outdoor heat exchanger is adjusted such that the plurality of first gears is switched gear by gear to increase the frequency of the fan. In some embodiments, each time the frequency of the fan is increased by switching to a first gear, the air-conditioning system operates for a first preset time, and then whether an exhaust temperature of the compressor is greater than a preset safety alert value is determined.

In some embodiments, referring to FIG. 1, after the fan is switched to a first gear corresponding to a maximum frequency, if it is monitored that the exhaust temperature of the compressor is still greater than the preset safety alert value, an opening degree of a flow regulating valve is adjusted, that is, step 108 is performed.

In one or more embodiments, the flow regulating valve is preset with a plurality of second gears corresponding to different opening degrees of the flow regulating valve. For example, the opening degree of the flow regulating valve is adjusted such that the plurality of second gears is switched gear by gear to increase the opening degree of the flow regulating valve. In some embodiments, each time the opening degree of the flow regulating valve is increased by switching to a second gear of the flow regulating valve, the air-conditioning system operates for a first preset time. Then, in a case where the exhaust temperature of the compressor is continuously not greater than the preset safety alert value within the second preset time, the adjustment to the opening degree of the flow regulating valve is stopped and a current operation state is maintained.

The control method for increasing amount of circulating refrigerant according to some implementations of the present disclosure will be introduced below.

The exhaust temperature of the compressor is continuously monitored for a time of Xmin. If the exhaust temperature of the compressor≤the safety alert value, the fan and the heating flow regulating valve in the air-conditioning system maintain in current control.

Continuous monitoring is performed for a time of Xmin. If the safety alert value<the exhaust temperature of the compressor≤the safety protection value, the frequency of the fan of the outdoor heat exchanger in the air-conditioning system is adjusted to a frequency a. The exhaust temperature of the compressor is continued to be monitored after operation for a time of Xmin.

Continuous monitoring is performed for a time of Xmin. If the safety alert value<the exhaust temperature of the compressor≤the safety protection value, the frequency of the fan of the outdoor heat exchanger in the air-conditioning system is adjusted to a frequency b. The exhaust temperature of the compressor is continued to be monitored after operation for a time of Xmin.

Continuous monitoring is performed for a time of Xmin. If the safety alert value<the exhaust temperature of the compressor≤the safety protection value, the frequency of the fan of the outdoor heat exchanger in the air-conditioning system is adjusted to a frequency c (a maximum operation frequency). The exhaust temperature of the compressor is continued to be monitored after operation for a time of Xmin.

Continuous monitoring is performed for a time of Xmin. If the exhaust temperature of the compressor≤the safety alert value, the frequency of the fan of the outdoor heat exchanger in the air-conditioning system is controlled to maintain in a current operation frequency, and the exhaust temperature of the compressor is monitored in real time during the operation.

Continuous monitoring is performed for a time of Xmin. If the safety alert value<the exhaust temperature of the compressor≤the safety protection value and the fan of the outdoor heat exchanger in the air-conditioning system has been adjusted to the frequency c (a maximum operation frequency), the flow regulating valve is opened to be of an opening degree D. The exhaust temperature of the compressor is continued to be monitored after operation for a time of Xmin.

Continuous monitoring is performed for a time of Xmin. If the safety alert value<the exhaust temperature of the compressor≤the safety protection value and the fan of the outdoor heat exchanger in the air-conditioning system has been adjusted to the frequency c (a maximum operation frequency), the flow regulating valve is opened to be of an opening degree E. The exhaust temperature of the compressor is continued to be monitored after operation for a time of Xmin.

Continuous monitoring is performed for a time of Xmin. If the safety alert value<the exhaust temperature of the compressor≤the safety protection value and the fan of the outdoor heat exchanger in the air-conditioning system has been adjusted to the frequency c (a maximum operation frequency), the flow regulating valve is opened to be of an opening degree F. (a maximum adjustable opening degree). The exhaust temperature of the compressor is continued to be monitored after operation for a time of Xmin.

Continuous monitoring is performed for a time of Xmin. If the exhaust temperature of the compressor≤the safety alert value, the fan of the outdoor heat exchanger in the air-conditioning system is controlled to maintain in a current operation frequency, and the flow regulating valve is controlled to maintain in a current opening degree.

In some embodiments, if the exhaust temperature of the compressor is greater than the safety alert value, the frequency of the fan of the outdoor heat exchanger is adjusted, and meanwhile the opening degree of the flow regulating valve is adjusted. For example, referring to FIG. 2, after step 104 is performed, step 202 is performed, that is, the frequency of the fan is increased and meanwhile the opening degree of the flow regulating valve is increased.

In some embodiments, the fan is preset with a plurality of first gears corresponding to different frequencies of the fan, and the frequency of the fan can increase with the adjustment to the plurality of first gears. The flow regulating valve is preset with a plurality of second gears corresponding to different opening degrees of the flow regulating valve. When the fan of the outdoor heat exchanger is switched to a first gear to increase the frequency of the fan, the flow regulating valve is controlled to switch to a second gear to increase the opening degree of the flow regulating valve. The frequency of the fan and the opening degree of the flow regulating valve are increased simultaneously, and the exhaust temperature of the compressor is rapidly reduced to be not greater than the preset safety alert value.

The control method for increasing amount of circulating refrigerant according to other implementations of the present disclosure will be introduced below.

Continuous monitoring is performed for a time of Xmin. If the exhaust temperature of the compressor≤the safety alert value, the fan and the heating flow regulating valve in the air-conditioning system maintain in current control.

Continuous monitoring is performed for a time of Xmin. If the safety alert value<the exhaust temperature of the compressor≤the safety protection value, the frequency of the fan of the outdoor heat exchanger in the air-conditioning system is adjusted to frequency a, and meanwhile the opening degree of the heating flow regulating valve is adjusted to opening degree d. The exhaust temperature of the compressor is continued to be monitored after operation for a time of Xmin.

Continuous monitoring is performed for a time of Xmin. If the safety alert value<the exhaust temperature of the compressor≤the safety protection value, the frequency of the fan of the outdoor heat exchanger in the air-conditioning system is adjusted to a frequency b, and meanwhile the opening degree of the heating flow regulating valve is adjusted to an opening degree e. The exhaust temperature of the compressor is continued to be monitored after operation for a time of Xmin.

Continuous monitoring is performed for a time of Xmin. If the safety alert value<the exhaust temperature of the compressor≤the safety protection value, the frequency of the fan of the outdoor heat exchanger in the air-conditioning system is adjusted to a frequency c (a maximum operation frequency), and meanwhile the opening degree of the heating flow regulating valve is adjusted to an opening degree f (a maximum adjustable opening degree). If the exhaust temperature of the compressor<the safety alert value, the opening degree of the heating flow regulating valve the frequency of the fan of the outdoor heat exchanger are maintained unchanged.

Figure 2:
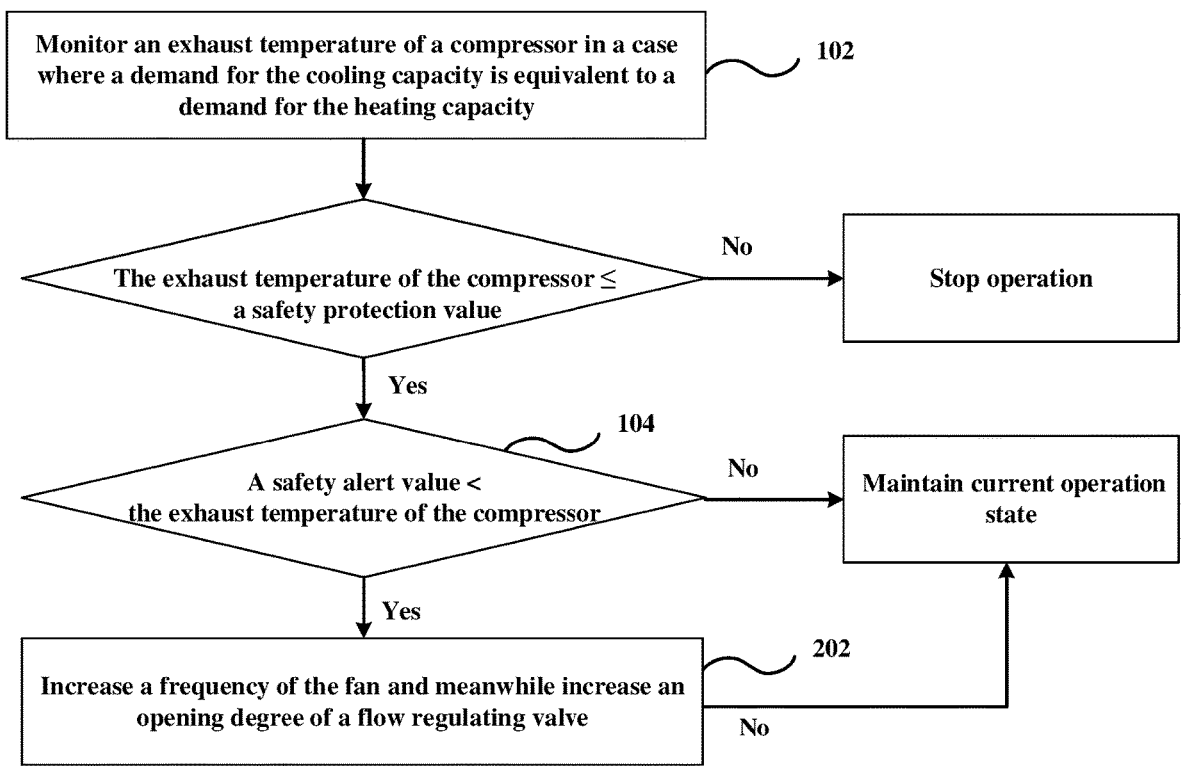
FIG. 2 is a flowchart of a control method for increasing amount of circulating refrigerant according to other embodiments of the present disclosure.

In one or more embodiments, referring to FIGS. 1 and 2, in a case where the exhaust temperature is greater than the preset safety protection value, the air-conditioning system is controlled to stop operation. For example, in a case where the exhaust temperature is greater than the preset safety protection value, a warning is issued to remind a user to handle failure to prevent an accident.

The present disclosure also provides an air conditioner that uses the above control method to improve amount of circulating refrigerant. In some embodiments, the air conditioner is a multi-split heat recovery system. It should be understood that the compressor, a temperature sensor for detecting the exhaust temperature of the compressor, the outdoor heat exchanger, and the fan of the outdoor heat exchanger, as well as the flow regulating valve provided in the heating section are all common members in the multi-split heat recovery system.

The embodiments of the present disclosure also provide a control device for increasing amount of circulating refrigerant, comprising: a determining module configured to determine whether an exhaust temperature of a compressor is greater than a preset safety alert value, in a case where a demand for a cooling capacity is equivalent to a demand for a heating capacity during an operation of an air-conditioning system; an adjusting module configured to adjust a frequency of a fan of an outdoor heat exchanger in a case where the exhaust temperature of the compressor is greater than the preset safety alert value; and a controlling module configured to control to stop adjusting the frequency of the fan and maintaining the air-conditioning system in operation at a current frequency of the fan after adjusting, in a case where the exhaust temperature of the compressor is not greater than the preset safety alert value.

The embodiments of the present disclosure also provide a control device for increasing amount of circulating refrigerant, comprising: a memory; and a processor coupled to the memory and configured to implement the control method for increasing amount of circulating refrigerant according to any one of the above embodiments based on instructions stored in the memory.

The embodiments of the present disclosure also provide an air conditioner, comprising the control device for increasing amount of circulating refrigerant according to any one of the above embodiments. For example, the air conditioner is a multi-split heat recovery system.

The embodiments of the present disclosure also provide a computer-readable storage medium storing computer program instructions thereon, wherein the control method for increasing amount of circulating refrigerant according to any one of the above embodiments is implemented when the instructions are executed by a processor.

The foregoing descriptions are only the preferred embodiments of the present disclosure, but do not serve to limit the present disclosure. Any amendment, equivalent replacement, improvement, or the like made within the spirit and principles of the present disclosure should all be contained within the protection scope of the present disclosure.

What is claimed is:

1. A control method for increasing amount of circulating refrigerant, comprising:
   determining whether an exhaust temperature of a compressor of an air-conditioning system is greater than a preset safety alert value, in a case where a demand for a cooling capacity is equivalent to a demand for a heating capacity during operation of an air-conditioning system and an outdoor heat exchanger of the air-conditioning system is in non-working state;
   adjusting a frequency of a fan of the outdoor heat exchanger, in a case where the exhaust temperature of the compressor is greater than the preset safety alert value to increase so that refrigerant stored in the outdoor heat exchanger is discharged into a refrigerant circulation system of the air-conditioning system; and controlling to stop adjusting the frequency of the fan and maintaining the air-conditioning system in operation at an adjusted current frequency of the fan, in a case where the exhaust temperature of the compressor is not greater than the preset safety alert value, wherein the air-conditioning system is a multi-split heat recovery system.

2. The control method for increasing amount of circulating refrigerant according to claim 1, wherein the fan is preset with a plurality of first gears corresponding to different frequencies of the fan; and the adjusting a frequency of a fan of the outdoor heat exchanger comprises: switching the plurality of first gears gear by gear to increase the frequency of the fan.

3. The control method for increasing amount of circulating refrigerant according to claim 2, wherein each time the frequency of the fan is increased by switching to a first gear, whether the exhaust temperature of the compressor is greater than the preset safety alert value is determined after operation for a first preset time.

4. The control method for increasing amount of circulating refrigerant according to claim 3, further comprising:

adjusting an opening degree of a flow regulating valve, in a case where the fan is switched to be of a first gear corresponding to a maximum frequency of the fan and the exhaust temperature of the compressor is monitored to be greater than the preset safety alert value.

5. The control method for increasing amount of circulating refrigerant according to claim 4, wherein the flow regulating valve is preset with a plurality of second gears corresponding to different opening degrees of the flow regulating valve; and the adjusting an opening degree of the flow regulating valve comprises: switching the plurality of second gears gear by gear to increase the opening degree of the flow regulating valve.

6. The control method for increasing amount of circulating refrigerant according to claim 5, wherein each time the opening degree of the flow regulating valve is increased by switching to a second gear, whether the exhaust temperature of the compressor is greater than the preset safety alert value is determined after operation for a first preset time.

7. The control method for increasing amount of circulating refrigerant according to claim 1, wherein the adjusting a frequency of a fan of the outdoor heat exchanger, in a case where the exhaust temperature of the compressor is greater than the preset safety alert value comprises:

adjusting the frequency of the fan of the outdoor heat exchanger, in a case where the exhaust temperature of the compressor is continuously greater than the preset safety alert value within a third preset time.

8. The control method for increasing amount of circulating refrigerant according to claim 1, wherein the adjusting a frequency of a fan of the outdoor heat exchanger comprises:

adjusting the frequency of the fan of the outdoor heat exchanger and meanwhile adjusting an opening degree of a flow regulating valve.

9. The control method for increasing amount of circulating refrigerant according to claim 8, wherein the fan is preset with a plurality of first gears corresponding to different frequencies of the fan, the flow regulating valve is preset with a plurality of second gears corresponding to different opening degrees of the flow regulating valve; and the adjusting the frequency of the fan of the outdoor heat exchanger and meanwhile adjusting an opening degree of a flow regulating valve comprises:

controlling the fan of the outdoor heat exchanger to switch to be of a first gear to increase the frequency and meanwhile controlling the flow regulating valve to switch to be of a second gear to increase the opening degree of the flow regulating valve.

10. The control method for increasing amount of circulating refrigerant according to claim 1, further comprising:

controlling the air-conditioning system to stop operation, in a case where the exhaust temperature is greater than a preset safety protection value which is greater than the preset safety alert value.

11. A control device for increasing amount of circulating refrigerant, comprising:

a memory; and a processor coupled to the memory and, based on instructions stored in the memory, configured to:

determine whether an exhaust temperature of a compressor of an air-conditioning system is greater than a preset safety alert value, in a case where a demand for a cooling capacity is equivalent to a demand for a heating capacity during operation of an air-conditioning system and an outdoor heat exchanger of the air-conditioning system is in non-working state;

adjust a frequency of a fan of the outdoor heat exchanger, in a case where the exhaust temperature of the compressor is greater than the preset safety alert value to increase so that refrigerant stored in the outdoor heat exchanger is discharged into a refrigerant circulation system of the air-conditioning system; and control to stop adjusting the frequency of the fan and maintaining the air-conditioning system in operation at an adjusted current frequency of the fan, in a case where the exhaust temperature of the compressor is not greater than the preset safety alert value, wherein the air-conditioning system is a multi-split heat recovery system.

12. An air conditioner, comprising the control device for increasing amount of circulating refrigerant according to claim 11.

13. A non-transitory computer-readable storage medium storing computer program instructions thereon, wherein the control method for increasing amount of circulating refrigerant according to claim 1 is implemented when the instructions are executed by a processor.

14. The control device for increasing amount of circulating refrigerant according to claim 11, wherein the fan is preset with a plurality of first gears corresponding to different frequencies of the fan; and the processor is configured to switch the plurality of first gears gear by gear to increase the frequency of the fan.

15. The control device for increasing amount of circulating refrigerant according to claim 14, wherein each time the frequency of the fan is increased by switching to a first gear, whether the exhaust temperature of the compressor is greater than the preset safety alert value is determined after operation for a first preset time.

16. The control device for increasing amount of circulating refrigerant according to claim 15, wherein the processor is further configured to adjust an opening degree of a flow regulating valve, in a case where the fan is switched to be of a first gear corresponding to a maximum frequency of the fan and the exhaust temperature of the compressor is monitored to be greater than the preset safety alert value.

17. The control device for increasing amount of circulating refrigerant according to claim 16, wherein the flow regulating valve is preset with a plurality of second gears corresponding to different opening degrees of the flow regulating valve; and the processor is configured to switch the plurality of second gears gear by gear to increase the opening degree of the flow regulating valve.

18. The control device for increasing amount of circulating refrigerant according to claim 17, wherein each time the opening degree of the flow regulating valve is increased by switching to a second gear, whether the exhaust temperature of the compressor is greater than the preset safety alert value is determined after operation for a first preset time.

19. The control device for increasing amount of circulating refrigerant according to claim 11, wherein the processor is configured to adjust the frequency of the fan of the outdoor heat exchanger, in a case where the exhaust temperature of the compressor is continuously greater than the preset safety alert value within a third preset time.

* * * * *